United States Patent
Kadota

(10) Patent No.: US 12,422,013 B2
(45) Date of Patent: Sep. 23, 2025

(54) SHOCK ABSORBER

(71) Applicant: Hitachi Astemo, Ltd., Hitachinaka (JP)

(72) Inventor: Nao Kadota, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 444 days.

(21) Appl. No.: 18/054,361

(22) Filed: Nov. 10, 2022

(65) Prior Publication Data

US 2023/0060765 A1    Mar. 2, 2023

Related U.S. Application Data

(63) Continuation of application No. PCT/JP2020/022763, filed on Jun. 10, 2020.

(51) Int. Cl.
- *F16F 9/32* (2006.01)
- *B62K 25/08* (2006.01)
- *F16F 9/18* (2006.01)

(52) U.S. Cl.
CPC .............. *F16F 9/3292* (2013.01); *F16F 9/18* (2013.01); *B62K 25/08* (2013.01);
(Continued)

(58) Field of Classification Search
CPC ........ F16F 9/18; F16F 9/3292; F16F 2222/12; F16F 2230/42; F16F 2232/08; F16F 2232/02; B62K 25/08
(Continued)

(56) References Cited

U.S. PATENT DOCUMENTS 1,691,723 A * 11/1928 Keys .................. B61F 5/16
                                                    267/141
4,883,150 A * 11/1989 Arai .................. F16F 9/3292
                                                    188/289
(Continued)

FOREIGN PATENT DOCUMENTS

DE    102006006286 A1 *  8/2006 .............. B62J 99/00
EP       1878648 A1 *  1/2008 .............. B62K 25/08
(Continued)

OTHER PUBLICATIONS

International Search Report mailed Aug. 25, 2020 for the corresponding International Patent Application No. PCT/JP2020/022763 (5 pages including English translation).
(Continued)

*Primary Examiner* — Thomas J Williams
(74) *Attorney, Agent, or Firm* — Leason Ellis LLP; Edward J. Ellis; Melvin C. Garner

(57) ABSTRACT

A shock absorber includes: a piston which is connected to an upper end of a rod by a fixing member and moves forward and backward in a cylinder; a conductor member which penetrates the piston from an upper end of an outer tube and extends into the rod; a coil which is provided in the rod so as to be capable of detecting a displacement of the conductor member with respect to the rod; an elastic body made of a resin material which is provided adjacent to the conductor member and on an outer side of an outer peripheral surface of the conductor member; and a support portion which supports an outer peripheral surface of the elastic body so as to restrict movement of the elastic body in a direction intersecting a center line of the conductor member.

11 Claims, 11 Drawing Sheets

(52) U.S. Cl.
CPC ....... *F16F 2222/12* (2013.01); *F16F 2230/08* (2013.01); *F16F 2230/42* (2013.01); *F16F 2232/08* (2013.01); *F16F 2234/02* (2013.01)

(58) Field of Classification Search
USPC ........................................ 267/292, 293, 141
See application file for complete search history.

(56) References Cited

U.S. PATENT DOCUMENTS

| | | | |
|---|---|---|---|
| 9,764,793 B2 * | 9/2017 | Murakami | F16F 9/465 |
| 2013/0320647 A1 * | 12/2013 | Awasa | B62K 25/08 |
| | | | 280/276 |
| 2016/0280315 A1 | 9/2016 | Murakami | |
| 2016/0288867 A1 | 10/2016 | Murakami | |
| 2022/0163086 A1 * | 5/2022 | Ikeda | F16F 9/165 |
| 2023/0060765 A1 * | 3/2023 | Kadota | F16F 9/18 |

FOREIGN PATENT DOCUMENTS

| | | | | |
|---|---|---|---|---|
| EP | 3073144 A1 * | 9/2016 | ............ | B62K 21/02 |
| EP | 3076042 A1 * | 10/2016 | ............ | B62K 25/08 |
| JP | H04258538 A * | 9/1992 | | |
| JP | 3106469 B2 * | 11/2000 | | |
| JP | 2016194320 A | 11/2016 | | |

OTHER PUBLICATIONS

German Office Action mailed Mar. 4, 2025 for the corresponding German Patent Application No. 112020006907.9 (15 pages including English translation).

* cited by examiner

SHOCK ABSORBER

CROSS-REFERENCE TO RELATED APPLICATION

This application is a Continuation of PCT application No. PCT/JP2020/022763 filed on Jun. 10, 2020, the content of which is incorporated herein by reference in its entirety.

FIELD OF THE INVENTION

The present invention relates to a shock absorber suitable for use in a straddle type vehicle.

BACKGROUND OF THE INVENTION

A shock absorber is used for a front fork of a straddle type vehicle represented by a motorcycle, a three-wheeled motor vehicle, or the like. In the front fork, for example, in order to grasp a traveling state of the straddle type vehicle, it may be required to detect a stroke amount of the shock absorber, which is an extension and contraction distance of the front fork. Such a shock absorber is known, for example, from JP2016-194320A.

A shock absorber disclosed in JP2016-194320A includes a piston rod extending from an upper end of an outer tube located on an upper side to an inside of an inner tube located on a lower side, a piston provided on the piston rod and partitioning the inside of the inner tube into an upper oil chamber and a lower oil chamber, and an elongated conductor member extending to the lower side from the piston. An upper end of the conductor member is fixed to the piston. A cylindrical coil portion is disposed on the lower side of the piston. A coil of the coil portion detects displacement of the conductor member with respect to the inner tube. The conductor member and the coil portion constitute a stroke sensor.

A shock absorber having a rod-shaped member extending from a lower end of an inner tube to an upper side is known. Such a shock absorber includes, for example, an outer tube located on the upper side, an inner tube located on a lower side, a cylinder extending from an upper end of the outer tube to an inside of the inner tube, a piston rod extending from a lower end of the inner tube to an inside of the cylinder, and a piston connected to an upper end of the piston rod.

In a case where a coil portion is disposed in a lower portion of the shock absorber, it is conceivable that the coil portion is provided in a hollow rod-shaped member. A conductor member moving forward and backward in the coil portion extends from the upper end of the outer tube to an inside of the rod-shaped member through a piston, and further extends to an inside of the coil portion. That is, the conductor member extends to the inside of the rod-shaped member through a through hole formed in the piston.

During driving of the straddle type vehicle, a bending force in a direction intersecting a center line of the front fork may act on the front fork due to an influence of an external force accompanying a braking operation or the like, for example. In a situation in which such a bending force acts on the front fork, a bending force may also act on the conductor member. When the bending force acts on the conductor member, a penetrated member that penetrates the conductor member and the conductor member that is bent by receiving the bending force may come into contact with each other. When the conductor member is worn by the contact and the conductor member is damaged, the durability of the stroke sensor may decrease.

An object of the present invention is to provide a shock absorber including a stroke sensor with improved durability.

The inventor of the present invention has newly found that when the front fork as disclosed in JP2016-194320A is used in, for example, a motocross, the bending force in the direction intersecting the center line of the front fork (hereinafter simply referred to as "bending force") increases when landing after jumping, and the durability of the stroke sensor may decrease. As a result of intensive studies on a configuration capable of withstanding use in a motocross, the present inventor has found that, by providing an elastic body that absorbs at least a part of the bending force applied to the conductor member adjacent to the conductor member, the conductor member becomes difficult to bend, and as a result, a shock absorber with improved durability can be provided. Furthermore, the present inventor has found that, by providing the elastic body between the conductor member and the penetrated member through which the conductor member penetrates to reduce a contact portion between the conductor member and the penetrated member, the conductor member and the penetrated member are less likely to come into contact with each other even when the conductor member receives a bending force, and as a result, it is possible to provide a shock absorber with improved durability. The present invention has been completed based on these findings.

SUMMARY OF THE INVENTION

According to an aspect of the present disclosure, there is provided a shock absorber including: an outer tube having a closed end at an upper end and an open end at a lower end; an inner tube having an open end at an upper end and a closed end at a lower end, the inner tube being partially fitted into the outer tube so as to be movable forward and backward; a cylinder extending from the upper end of the outer tube into the inner tube; a first rod having a cylindrical shape and extending from the lower end of the inner tube into the cylinder; a first piston fixed to an upper end of the first rod by using a first fixing member, the first piston being movable forward and backward in an upper-lower direction inside the cylinder; a conductor member which is a rod-shaped conductor extending from the upper end of the outer tube into the first rod through the first piston; a coil provided inside the first rod so as to be capable of detecting a displacement of the conductor member with respect to the first rod; a first elastic body made of an elastic material and provided adjacent to the conductor member on an outer side of an outer peripheral surface of the conductor member; and a support portion configured to support an outer peripheral surface of the first elastic body so as to restrict movement of the first elastic body in a direction intersecting a center line of the conductor member.

According to another aspect of the present disclosure, there is provided a shock absorber including: an outer tube having a closed end at an upper end and an open end at a lower end; an inner tube having an open end at an upper end and a closed end at a lower end, the inner tube being partially fitted into the outer tube so as to be movable forward and backward; a cylinder extending from the upper end of the outer tube into the inner tube; a first rod having a cylindrical shape and extending from the lower end of the inner tube into the cylinder; a first fixing member provided at an upper end of the first rod; a first piston connected to the upper end of the first rod in an axial direction of the first rod by the first fixing member and a first nut, the first piston being movable forward and backward in an upper-lower direction inside the cylinder; a second rod extending from the upper end of the outer tube into the cylinder; a second fixing member provided at a lower end of the second rod; a second piston connected to the lower end of the second rod in an axial direction of the second rod by the second fixing member and a second nut, the second piston being movable forward and backward in the upper-lower direction inside the cylinder; a first surface of the second nut that faces the second piston side and is orthogonal to a center line of the first rod; a base end portion having a second surface facing the first surface and a second groove provided in the second surface and recessed in a direction of the center line of the first rod; a second elastic body made of an elastic material, the second elastic body being fitted into the second groove, and a part of the second elastic body protruding from the second groove and being in contact with the first surface; a conductor member which is a rod-shaped conductor extending from the base end portion into the first rod through the first piston; an annular bush made of resin and having a through hole for supporting an outer peripheral surface of an intermediate portion of the conductor member in a direction of the center line; a first elastic body made of an elastic material, the first elastic body being fitted into a first groove formed on an outer peripheral surface of the bush over an entire periphery, and supporting the outer peripheral surface of the bush by a part protruding from the first groove; a support portion configured integrally with the first nut and configured to support the outer peripheral surface of the first elastic body on the first fixing member, and a coil provided inside the first rod so as to be capable of detecting a displacement of the conductor member with respect to the first rod.

In the present invention, a shock absorber including a stroke sensor with improved durability can be provided.

DETAILED DESCRIPTION OF THE INVENTION

Figure 1:
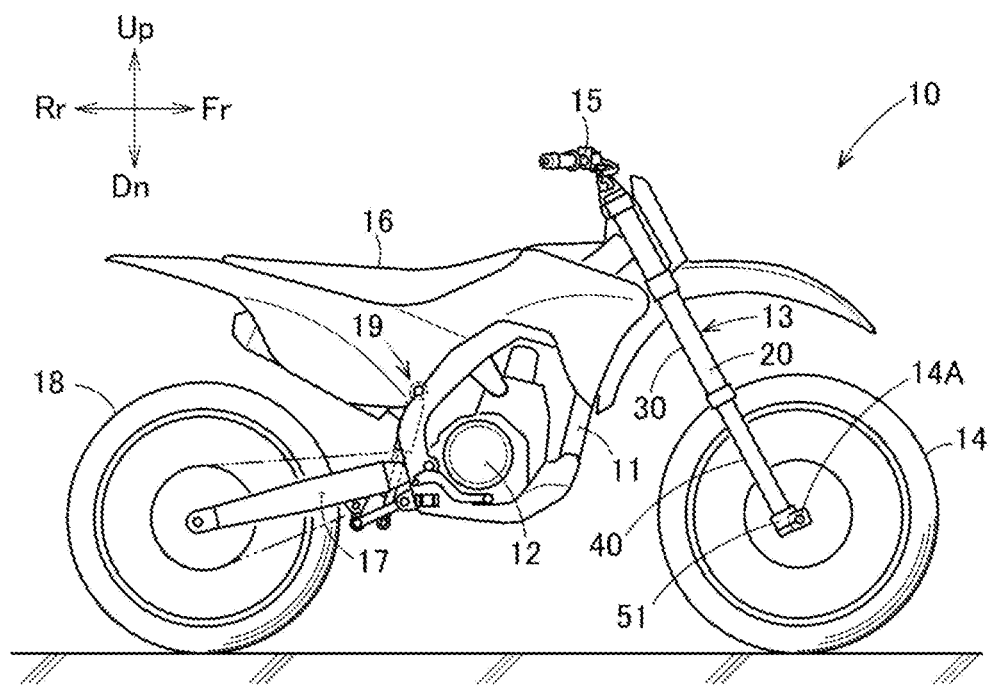
FIG. 1 is a side view of a motorcycle on which a front fork including a shock absorber according to a first embodiment is mounted.

Embodiments of the present invention will be described below with reference to the accompanying drawings. The embodiments shown in the accompanying drawings are examples of the present invention, and the present invention is not limited to the embodiments. In the description, left and right refer to left and right with respect to an occupant riding in a vehicle, and front and rear refer to front and rear with respect to a traveling direction of the vehicle. In the drawings, Fr indicates a front direction, Rr indicates a rear direction, Up indicates an upper direction, and Dn indicates a lower direction.

First Embodiment

A shock absorber 20 according to the first embodiment will be described with reference to FIGS. 1 to 9.

As shown in FIG. 1, the shock absorber 20 is applied to a straddle type vehicle on which an occupant straddles, such as a motorcycle or a three-wheeled motor vehicle, for example, and is applicable to a front fork of the motorcycle as an example.

A motorcycle 10 includes a vehicle body 11, an engine 12 as a power source supported at a central lower portion of the vehicle body 11, front forks 13 provided at a front portion of the vehicle body 11, a front wheel 14 which is a wheel supported by the front fork 13, and a steering handlebar 15 connected to the front fork 13. The motorcycle 10 includes an occupant seat 16 provided at a center of an upper portion of the vehicle body 11, a wheel support mechanism 17 extending toward the rear side from a rear portion of the vehicle body 11 and capable of swinging in an upper-lower direction, a rear wheel 18 which is a wheel supported by the wheel support mechanism 17, and a rear suspension 19 bridged between the vehicle body 11 and the wheel support mechanism 17.

Hereinafter, a shock absorber 20 applicable to at least one of two front forks 13 respectively provided on both sides of the front wheel 14 will be described in detail.

Figure 2:
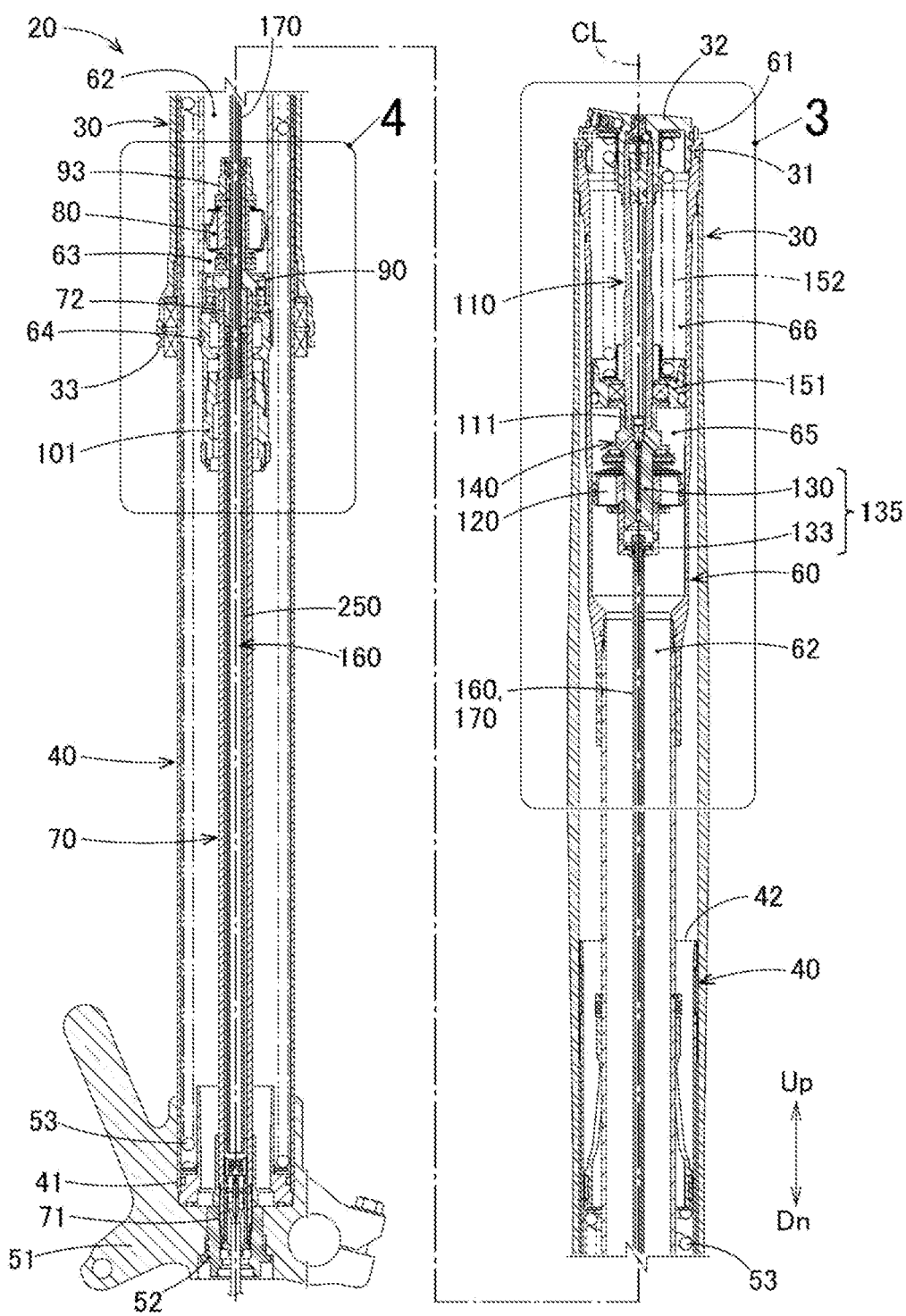
FIG. 2 is a sectional view illustrating one shock absorber constituting the front fork shown in FIG. 1.
Figure 3:
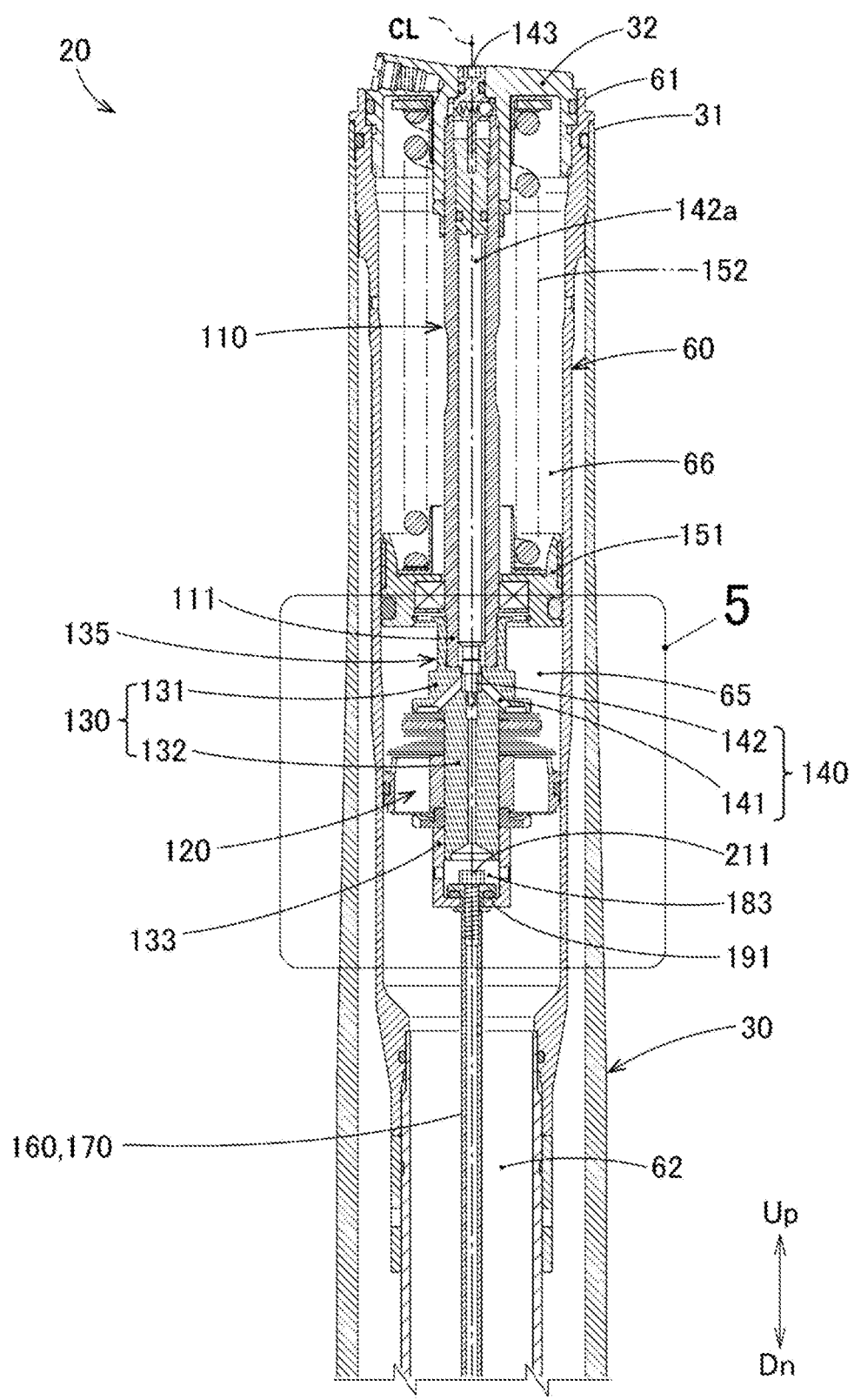
FIG. 3 is an enlarged view of a portion 3 in FIG. 2.
Figure 4:
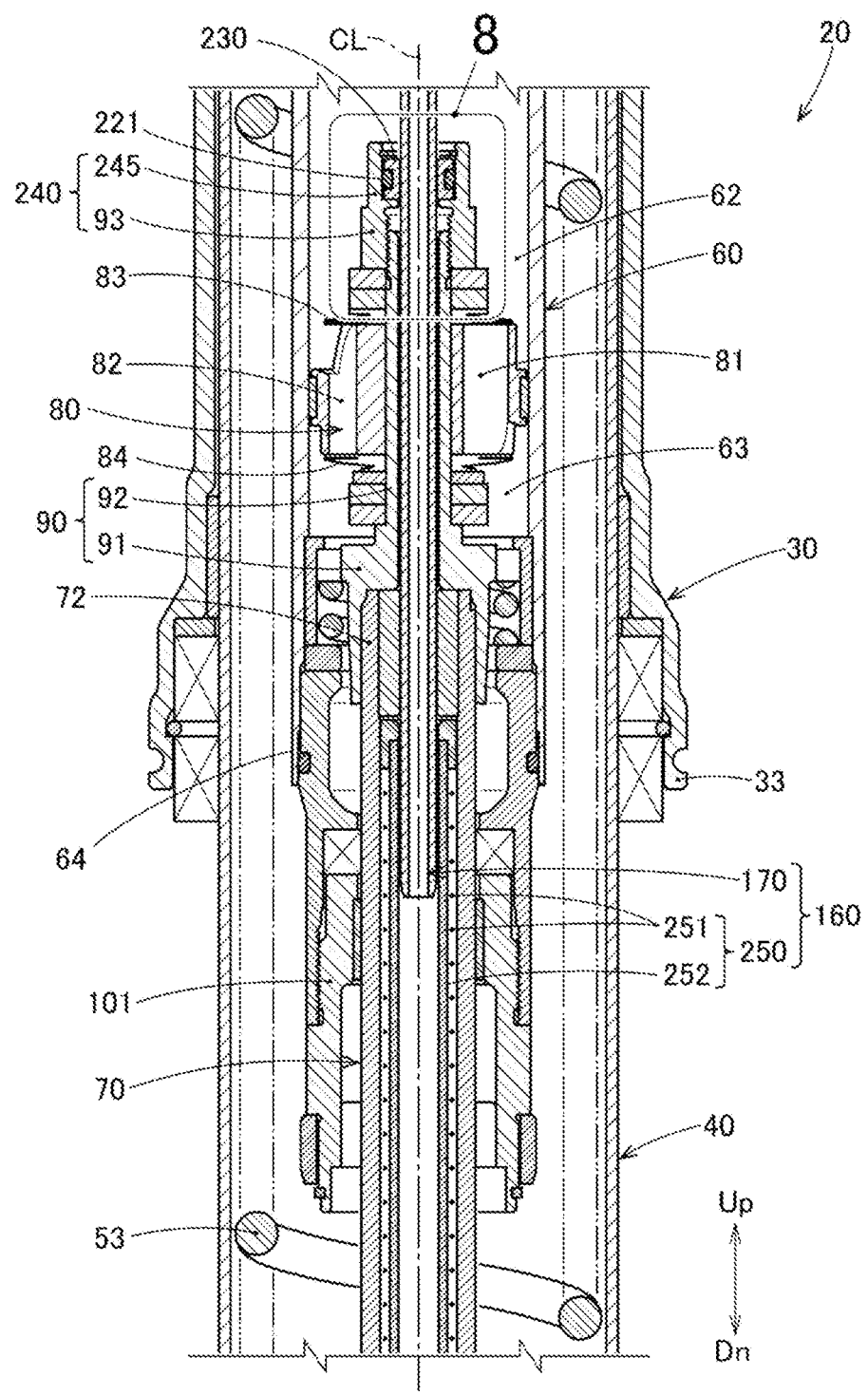
FIG. 4 is an enlarged view of a portion 4 in FIG. 2.

As shown in FIGS. 2 to 4, the shock absorber 20 includes an outer tube 30 and an inner tube 40, a suspension spring 53 whose lower end portion is in the inner tube 40, and a cylinder 60 extending from an upper end 31 of the outer tube 30 into the inner tube 40. The shock absorber 20 further includes a first rod 70 extending toward the upper side from a lower end 41 of the inner tube 40, a first piston 80 fixed to an upper end of the first rod 70, a second rod 110 extending from the upper end 31 of the outer tube 30 into the cylinder 60, and a second piston 120 fixed to a lower end 111 of the second rod 110. That is, the shock absorber 20 has a telescopic configuration in which the inner tube 40 on the wheel side can move forward and backward with respect to the outer tube 30 on the vehicle body side. A center line of the outer tube 30, the inner tube 40, the suspension spring 53, the cylinder 60, the first rod 70, the first piston 80, the second rod 110, and the second piston 120 is a center line CL.

The outer tube 30 is a cylindrical member, and extends in the upper-lower direction and has the upper end 31 closed by a fork bolt 32. The upper end 31 of the outer tube 30 is a closed end, and a lower end 33 of the outer tube 30 is an open end.

The inner tube 40 is a cylindrical member, and a part of the inner tube 40 is fitted into the outer tube 30 so as to be movable forward and backward along the center line CL. The lower end 41 of the inner tube 40 is provided on an axle bracket 51 for supporting an axle 14A (see FIG. 1) for the front wheel 14, and the lower end 41 is closed by a bottom bolt 52. The lower end 41 is a closed end, and an upper end 42 of the inner tube 40 is an open end.

The suspension spring 53 is a compression coil spring. A lower end of the suspension spring 53 is disposed inside the inner tube 40 and extends from the lower end 41 toward the upper end 42 of the inner tube 40. The suspension spring 53 applies a force to the outer tube 30 and the inner tube 40 in a direction away from each other along the center line CL.

The cylinder 60 is a cylindrical member. An upper end 61 of the cylinder 60 is a closed end, and is screwed to an inner peripheral surface of the upper end 31 of the outer tube 30. A gap between the upper end 31 of the outer tube 30 and the upper end 61 of the cylinder 60 is sealed using a sealing material.

The first rod 70 is a circular tubular member. A lower end 71 of the first rod 70 is screwed to the bottom bolt 52.

As shown in FIG. 4, the first piston 80 is integrally connected to an upper end 72 of the first rod 70, and can move forward and backward in the upper-lower direction inside the cylinder 60. The inside of the cylinder 60 is partitioned by the first piston 80 into a first chamber 62 on the upper side of the first piston 80 and a second chamber 63 on the lower side of the first piston 80. A fluid (for example, oil) is contained in the first chamber 62 and the second chamber 63.

The first piston 80 includes a first flow passage 81 and a second flow passage 82. The first flow passage 81 communicates with the first chamber 62 and the second chamber 63, and a first valve 83 is provided at an upper end of the first flow passage 81. The second flow passage 82 communicates with the first chamber 62 and the second chamber 63, and a second valve 84 is provided at a lower end of the second flow passage 82.

A first fixing member 90 is screwed to an outer peripheral surface of the upper end 72 of the first rod 70. The first fixing member 90 includes a bottomed cylindrical base portion 91 having an opening on the lower side, a cylindrical extending portion 92 extending toward the upper side from the base portion 91 along the center line CL, and a first nut 93 disposed on the upper side of the first piston 80. The base portion 91 is screwed to the upper end 72 of the first rod 70. The extending portion 92 penetrates the first piston 80 in the upper-lower direction, and the first nut 93 is screwed to an upper end portion of the extending portion 92. As a result, the first piston 80 is connected to the upper end 72 of the first rod 70 by the first fixing member 90. That is, the first fixing member 90 fixes the first piston 80 in an axial direction of the first rod 70 by the first nut 93.

A portion of the first rod 70 on the lower side of the upper end 72 screwed by the first fixing member 90 is supported by a lower end 64 of the cylinder 60 via a rod guide 101.

As shown in FIG. 3 and the like, the second rod 110 is a circular tubular member.

The second piston 120 is connected to the lower end 111 of the second rod 110 by using a second fixing member 135, and can move forward and backward in the upper-lower direction inside the cylinder 60. The inside of the cylinder 60 is partitioned by the second piston 120 into a first chamber 62 on the upper side of the second piston 120 and a third chamber 65 on the upper side of the second piston 120. The second fixing member 135 includes a connecting member 130 and a second nut 133.

The connecting member 130, which is a part of the second fixing member 135, is screwed to an outer peripheral surface of the lower end 111 of the second rod 110. The connecting member 130 includes a base portion 131 having a bottomed cylindrical shape with an opening on the upper side, and a rod-shaped extending portion 132 extending toward the lower side from the base portion 131 along the center line CL. The base portion 131 is screwed to the lower end 111 of the second rod 110. The extending portion 132 penetrates the center of the second piston 120 in the upper-lower direction, and the second nut 133 is screwed to a lower end of the extending portion 132. As a result, the second piston 120 is fixed to the lower end 111 of the second rod 110 using the connecting member 130.

The second piston 120 includes a first flow passage 121 and a second flow passage 122. The first flow passage 121 communicates with the first chamber 62 and the third chamber 65, and a first valve 123 is provided at an upper end of the first flow path 121. The second flow passage 122 communicates with the first chamber 62 and the third chamber 65, and a second valve 124 is provided at a lower end of the second flow path 122.

Further, the connecting member 130 is provided with a damping force adjustment unit 140. The damping force adjustment unit 140 includes a communication passage 141 provided in the base portion 131 and the extending portion 132 so as to communicate the first chamber 62 and the third chamber 65, and a needle-shaped valve 142 interposed in the communication passage 141.

The communication passage 141 is a communication passage that bypasses the first flow passage 121 and the second flow passage 122, and allows the first chamber 62 and the third chamber 65 to communicate with each other via the connecting member 130.

A flow passage cross-sectional area of the communication passage 141 is adjusted by operating an operation member 143 to move the valve 142 up and down. The operation member 143 is rotatably provided at an upper end of the fork bolt 32, and is connected to a valve rod 142a of the valve 142. A tip (lower end) of the valve rod 142a enters the inside of the connecting member 130, and the valve rod 142a moves up and down in a direction along the center line CL by rotating the operation member 143.

Description will be made with reference to FIG. 3. A free piston 151 is fitted to a portion of the second rod 110 on the upper side of the lower end 111 to which the connecting member 130 is screwed so as to be relatively movable in the upper-lower direction along the center line CL. The free piston 151 can move forward and backward in the upper-lower direction in the cylinder 60, and a downward force is applied to the free piston 151 by a spring 152. The inside of the cylinder 60 on the upper side of the second piston 120 is partitioned by the free piston 151 into the third chamber 65 on the lower side of the free piston 151 and a fourth chamber 66 on the upper side of the free piston 151.

As shown in FIGS. 2 and 3, the shock absorber 20 includes a stroke sensor 160. The stroke sensor 160 includes a conductor member 170, which is a circular tubular conductor, and a coil unit 250.

The conductor member 170 is a circular tubular member extending from the second piston 120, more specifically, from the second nut 133 included in the second fixing member 135 fixing the second piston 120 to the inside of the first rod 70 through the first piston 80. The center line of the conductor member 170 is the center line CL.

Figure 5:
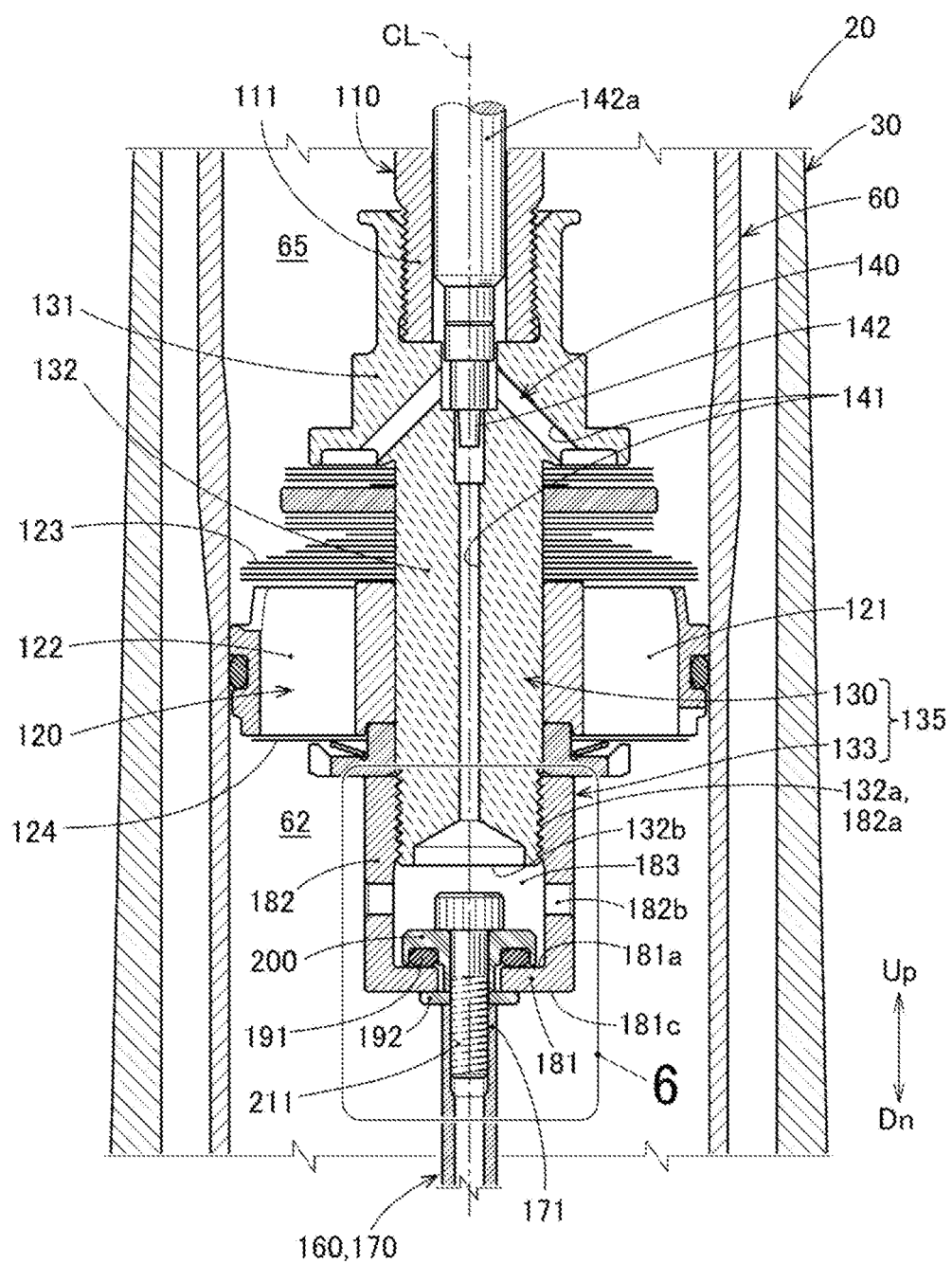
FIG. 5 is an enlarged view of a portion 5 in FIG. 3.
Figure 6:
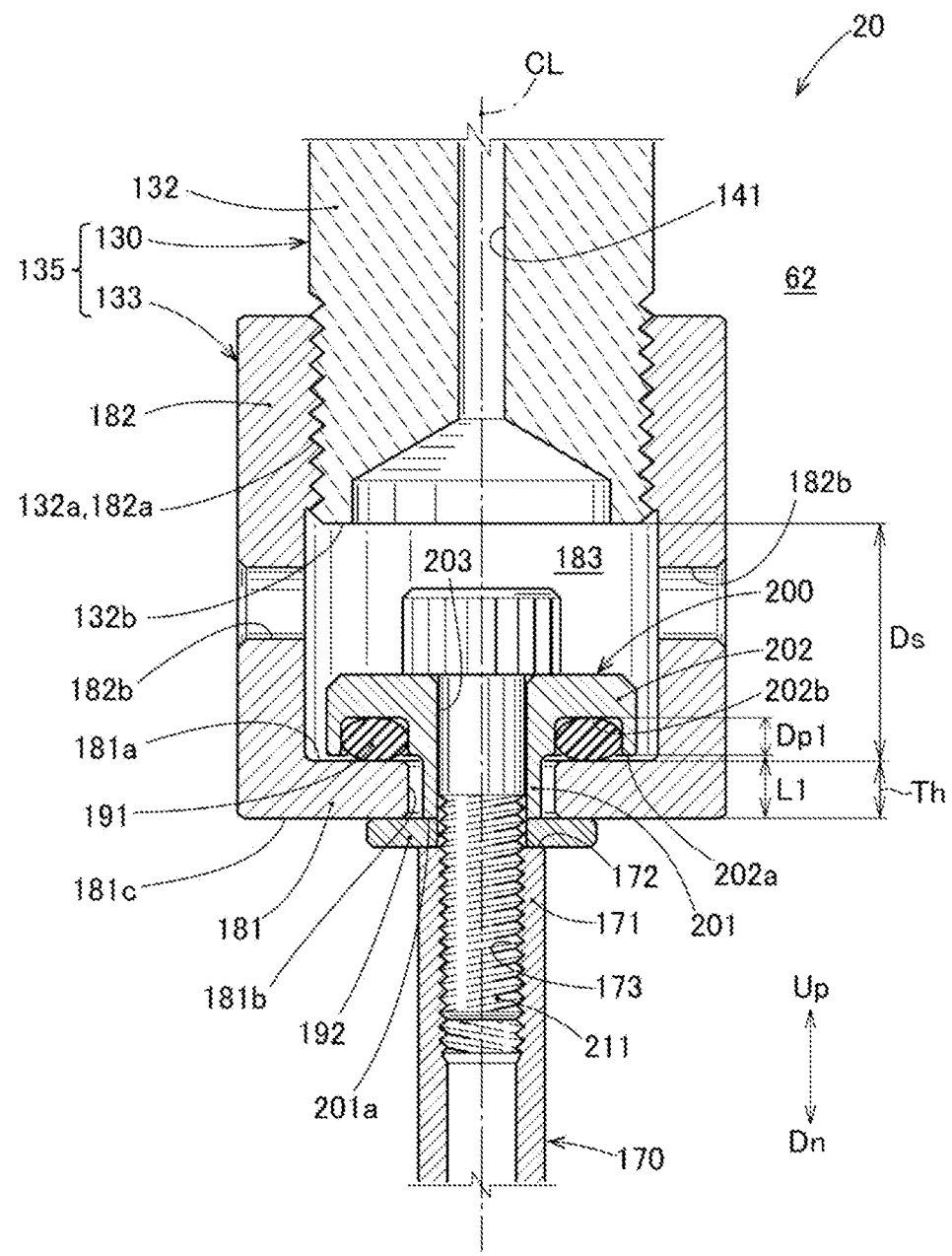
FIG. 6 is an enlarged view of a portion 6 in FIG. 5.
Figure 7:
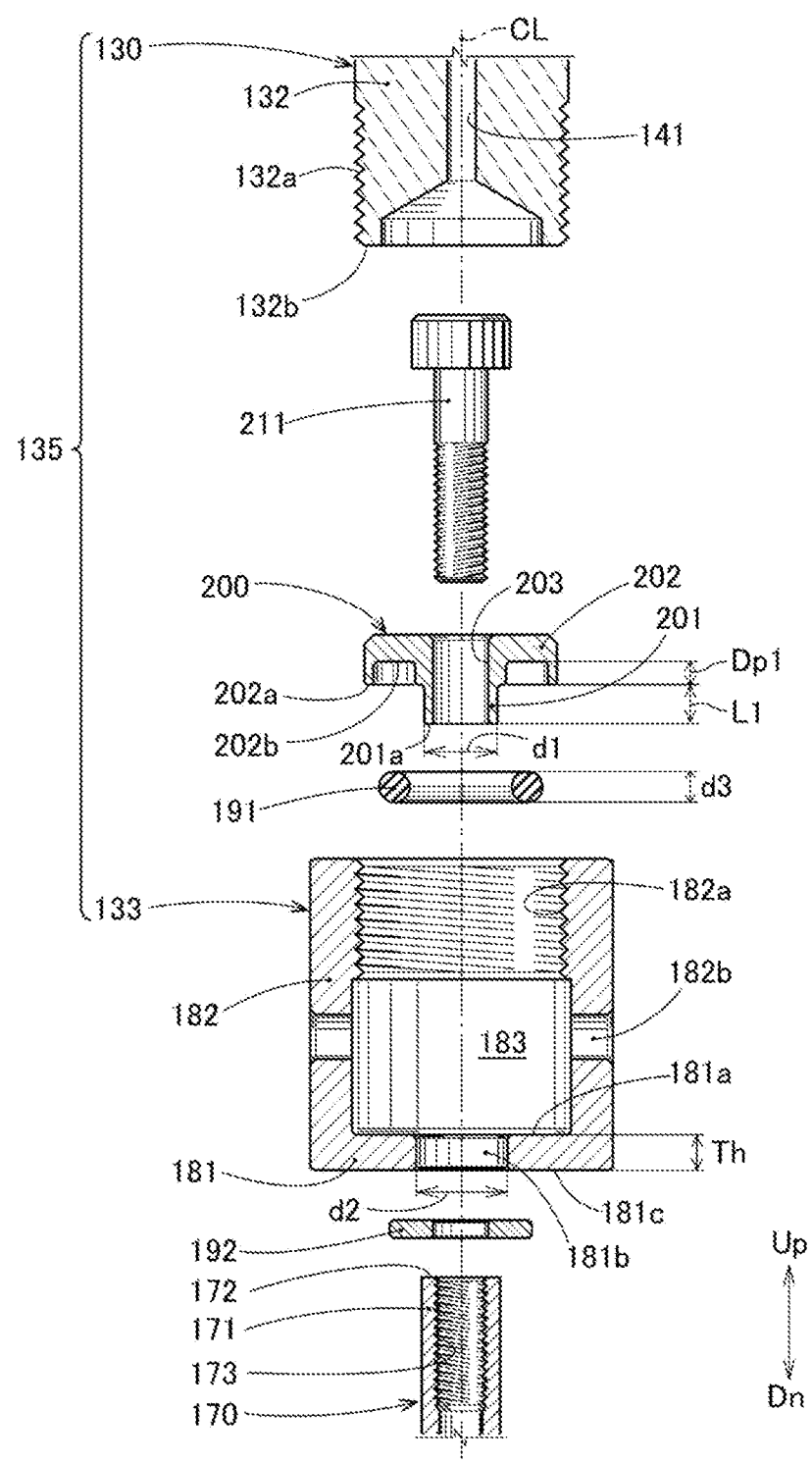
FIG. 7 is a view illustrating a support structure of a second piston holder, a second nut, and an upper end of a conductor member shown in FIG. 6.

As shown in FIGS. 5 to 7, an upper end portion 171 of the conductor member 170 is fixed to the second nut 133 by being connected to the second nut 133. The second nut 133 is a bottomed cylindrical member having an opening on the upper side, and includes a flat bottom plate 181 having a flat plate shape, and a cylindrical tubular portion 182 standing from an edge of the bottom plate 181. An inner peripheral surface of the tubular portion 182 includes a female screw 182a to which a male screw 132a at the lower end of the extending portion 132 of the connecting member 130 is screwed.

An inner surface 181a, which is an upper surface of the bottom plate 181, faces a lower end surface 132b of the extending portion 132 of the connecting member 130. The inner surface 181a is a flat surface orthogonal to the center line CL of the conductor member 170. Hereinafter, the inner surface 181a is referred to as a "first surface 181a". The bottom plate 181 has a through hole 181b penetrating the bottom plate 181 in the upper-lower direction. A center line of the through hole 181b is the center line CL.

The second piston 120 is held between the base portion 131 of the connecting member 130 and the second nut 133. In this state, the first surface 181a is separated downward from the lower end surface 132b of the connecting member 130 by a distance Ds. Therefore, a space 183 is provided between the first surface 181a and the lower end surface 132b of the connecting member 130. The tubular portion 182 has a communication hole 182b that allows the communication passage 141 and the space 183 to communicate with the first chamber 62.

The upper end portion 171 of the conductor member 170 is elastically supported on the first surface 181a by using a second elastic body 191 made of an elastic material. As a result, the upper end portion 171 of the conductor member 170 is connected to the nut 133 so as to be swingable with respect to the center line CL. Hereinafter, a support structure of the upper end portion 171 of the conductor member 170 will be described in detail.

A lower surface 181c of the bottom plate 181, which is a back surface of the first surface 181a, is a flat surface parallel to a flat surface 181a. An upper end surface 172 of the conductor member 170 overlaps the lower surface 181c via a flat washer 192.

A base end portion 200 facing the upper end surface 172 of the conductor member 170 via the bottom plate 181 is positioned in the space 183. The base end portion 200 includes a cylindrical base portion 201 and a flange 202 formed integrally with an upper end of the base portion 201 and extending in a direction away from the center line CL. A center line of the base portion 201 and the flange 202 is the center line CL.

The base end portion 200 has a through hole 203 penetrating the base end portion 200 in the upper-lower direction. The base portion 201 is fitted into the through hole 181b of the bottom plate 181 from the space 183 side. An outer diameter d1 of the base portion 201 is smaller than a diameter d2 of the through hole 181b. A distal end surface 201a of the base portion 201 overlaps the upper end surface 172 of the conductor member 170 via the washer 192.

The flange 202 of the base end portion 200 has a flat second surface 202a facing the first surface 181a. A length L1 from the second surface 202a to the distal end surface 201a of the base portion 201 is larger than a plate thickness Th of the bottom plate 181 of the second nut 133.

The base end portion 200 is screwed to the upper end portion 171 of the conductor member 170 using a bolt 211. In a state where the upper end surface 172 of the conductor member 170 overlaps the lower surface 181c of the bottom plate 181 via the washer 192 and the flange 202 of the base end portion 200 faces the first surface 181a of the bottom plate 181, the bolt 211 is inserted into the through hole 203 of the base end portion 200 from the space 183 side. A female screw 173 is formed on an inner peripheral surface of the upper end portion 171 of the conductor member 170. The bolt 211 passes through the through hole 203 of the base end portion 200 and a hole of the washer 192, and is screwed to the female screw 173 of the conductor member 170, so that the conductor member 170 and the base end portion 200 are integrated via the bottom plate 181.

The annular second elastic body 191 is made of rubber. The second elastic body 191 is preferably an O-ring. The second surface 202a of the flange 202 has an annular second groove 202b into which the second elastic body 191 is fitted. A depth Dp1 of the second groove 202b is smaller than a thickness d3 (diameter d3) of the second elastic body 191. Therefore, a part of the second elastic body 191 protrudes from the second groove 202b, and the second elastic body 191 is in direct contact with the first surface 181a.

The second surface 202a of the flange 202 floats from the first surface 181a by an amount by which the second elastic body 191 protrudes from the second groove 202b. Therefore, the flange 202 is supported by the annular second elastic body 191 in a state of floating from the bottom plate 181. Accordingly, the flange 202 is allowed to swing in a direction intersecting the center line CL, and the conductor member 170 connected to the flange 202 using the bolt 211 is also allowed to swing in the direction intersecting the center line CL.

As described above, the upper end portion 171 of the conductor member 170 is connected to the second fixing member 135 by using the second elastic body 191 and the base end portion 200. By connecting the upper end portion 171 to the second fixing member 135 using the second elastic body 191 in a state where the second surface 202a of the flange 202 and the first surface 181a of the second nut 133 are not in contact with each other, the conductor member 170 is connected to the second fixing member 135 in a state where the conductor member 170 is allowed to swing in the direction intersecting the center line CL. Accordingly, a part of the bending force applied to the conductor member 170 can be absorbed by the second elastic body 191, and thus the conductor member 170 can be made difficult to bend.

Figure 8:
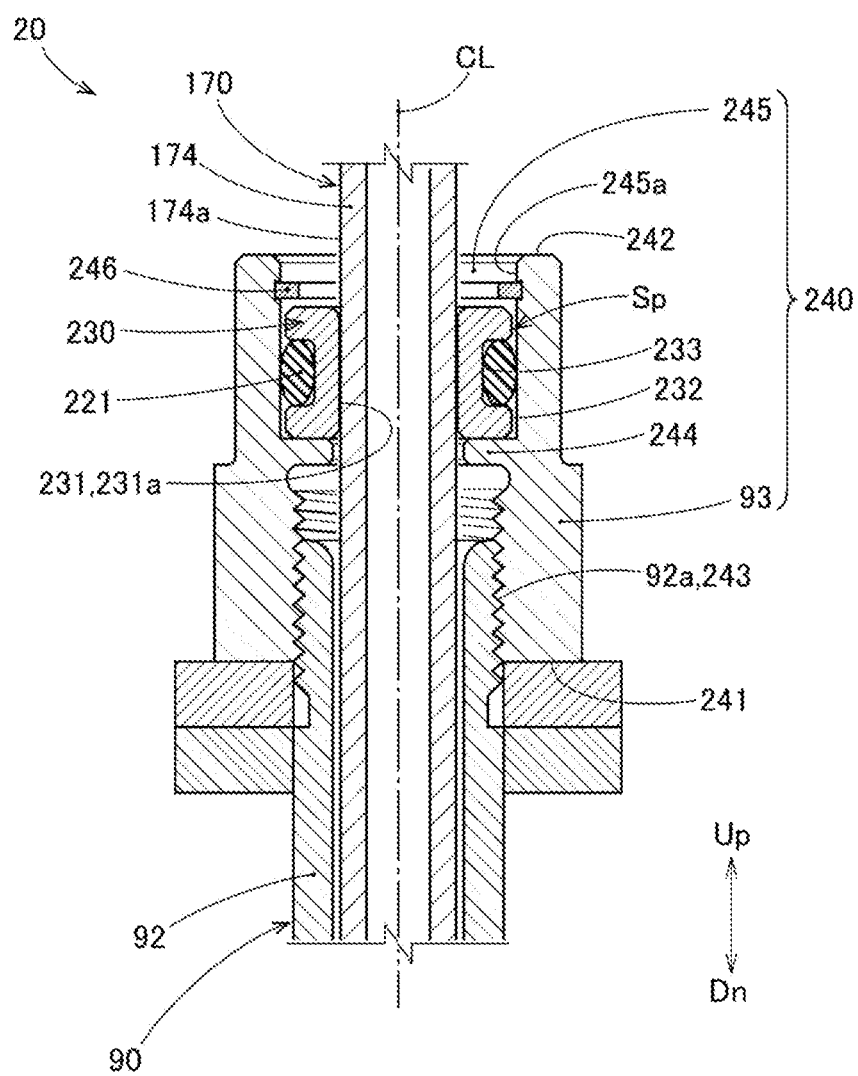
FIG. 8 is an enlarged view of a portion 8 in FIG. 4.
Figure 9:
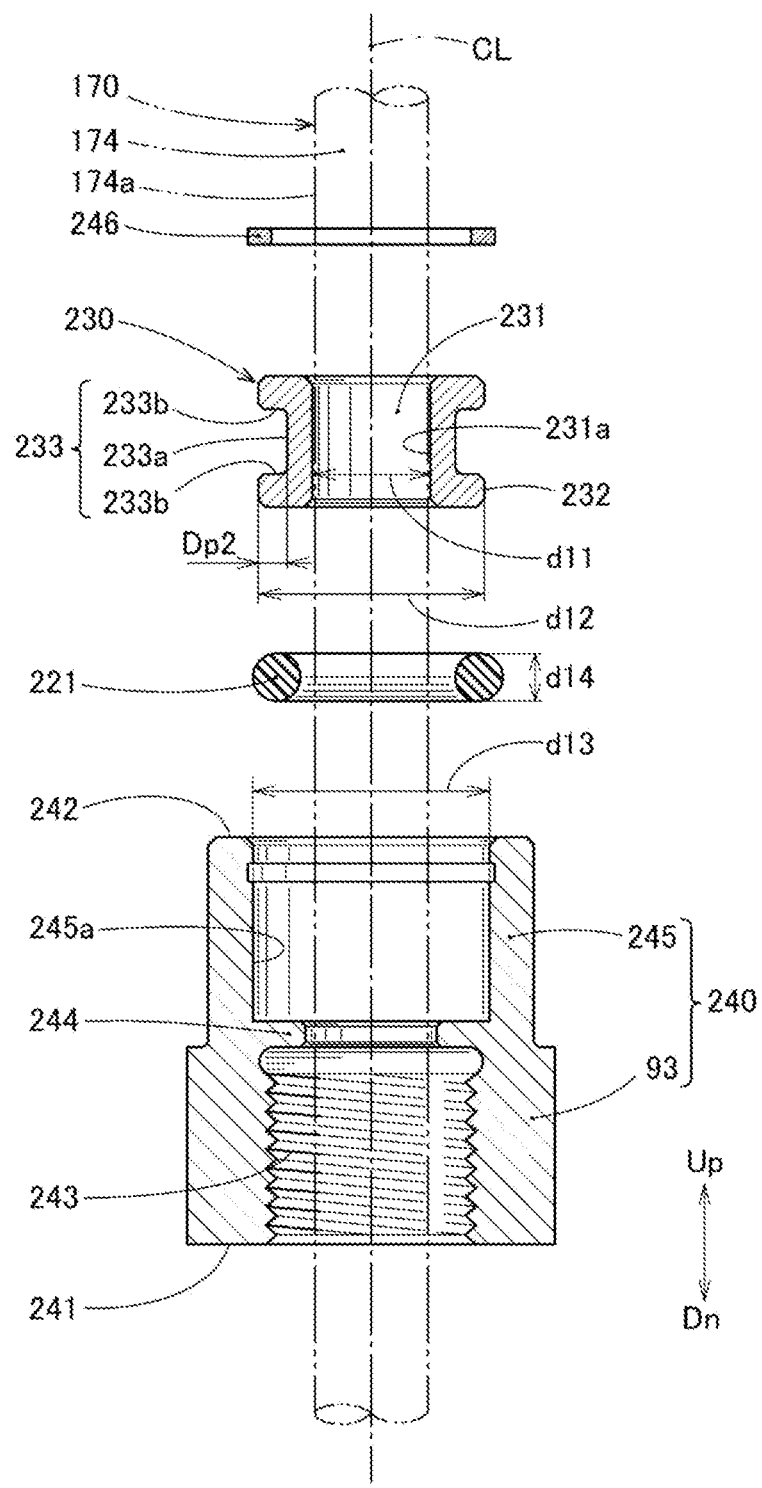
FIG. 9 is a view illustrating a support structure of a first nut and an intermediate portion of the conductor member shown in FIG. 8.

As shown in FIGS. 4, 8, and 9, an outer peripheral surface 174a of the intermediate portion 174 of the conductor member 170 is supported by the first nut 93 using an annular first elastic body 221 made of an elastic material such that the conductor member 170 and the first nut 93 do not directly contact each other. Here, the "intermediate portion 174 of the conductor member 170" is a portion excluding the upper end portion 171 and a lower end of the conductor member 170, and more specifically, a portion penetrating the first fixing member 90. Hereinafter, a support structure of the intermediate portion 174 of the conductor member 170 will be described in detail.

The intermediate portion 174 of the conductor member 170 is supported by a support portion 245 via a bush 230 and the first elastic body 221. The first elastic body 221 is provided on an outer side of the outer peripheral surface 174a of the conductor member 170, which is the side away from the center line CL. The support portion 245 supports an outer peripheral surface of the first elastic body 221 so as to restrict the movement of the first elastic body 221 in the direction intersecting the center line CL. The first nut 93 is provided on the lower side of the support portion 245. In the present embodiment, the support portion 245 and the first nut 93 are integrated with each other, and the support portion 245 and the first nut 93 constitute one holding member 240. The holding member 240 including the first nut 93 and the support portion 245 is a cylindrical member, and a center line of the holding member 240 is the center line CL. The first nut 93 has a female screw 243 on an inner peripheral surface thereof, and a stepped portion 244 having a diameter smaller than that of the female screw 243 on the upper side of the female screw 243.

The female screw 243 opens in a lower end surface 241 of the holding member 240. The female screw 243 is screwed to a male screw 92a provided on an outer peripheral surface of an upper end of the extending portion 92 of the first fixing member 90. The support portion 245 is continuous with an upper end surface 242 of the holding member 240. The bush 230 and the first elastic body 221 are fitted to an inner peripheral surface 245a of the support portion 245, and a retaining ring 246 is fitted to the upper side of the bush 230 and the first elastic body 221. The stepped portion 244 is a portion that restricts the bush 230 from moving downward, and the retaining ring 246 restricts the bush 230 from moving upward.

The bush 230 is a member made of resin, and guides the conductor member 170 so as to be slidable in the upper-lower direction along the center line CL. The resin constituting the bush 230 is not particularly limited, and a resin capable of withstanding the use environment of the shock absorber 20 can be appropriately used. Examples of such a resin include engineering plastics.

The bush 230 is an annular member having a through hole 231 that supports the outer peripheral surface 174a of the intermediate portion 174 of the conductor member 170. An inner diameter d11 of the through hole 231 is large enough to support the outer peripheral surface 174a of the conductor member 170 by an inner peripheral surface 231a of the through hole 231 such that the outer peripheral surface 174a is slidable in the upper-lower direction along the center line CL. An outer diameter d12 of the bush 230 is smaller than an inner diameter d13 of the support portion 245. Therefore, a gap Sp (see FIG. 8) is provided between an outer peripheral surface 232 of the bush 230 and the inner peripheral surface 245a of the support portion 245. With such a configuration, the conductor member 170 and the bush 230 are allowed to move in the direction intersecting the center line CL.

The annular first elastic body 221 is made of rubber. The first elastic body 221 is preferably an O-ring. The outer peripheral surface 232 of the bush 230 has an annular first groove 233 into which the first elastic body 221 is fitted. The first groove 233 is formed so as to be continuous around the entire periphery of the outer peripheral surface 232 of the bush 230. The first groove 233 has a bottom surface 233a and a pair of side surfaces 233b and 233b in the upper-lower direction. Since the first elastic body 221 is fitted into the first groove 233 in such a manner, the first elastic body 221 is prevented from falling off from the first groove 233.

A depth Dp2 of the first groove 233 shown in FIG. 9 is smaller than a thickness d14 (diameter d14) of the first elastic body 221. Therefore, a part of the outer peripheral surface of the first elastic body 221 protrudes outward from the first groove 233 in the direction intersecting the center line CL, and the first elastic body 221 is in direct contact with the inner peripheral surface 245a of the support portion 245.

The bush 230 floats from the inner peripheral surface 245a of the support portion 245 by an amount by which the first elastic body 221 protrudes from the first groove 233. Therefore, the bush 230 is supported by the annular first elastic body 221 in a state in which the bush 230 has a portion that does not come into contact with the inner peripheral surface 245a of the support portion 245. Accordingly, the bush 230 is allowed to swing in the direction intersecting the center line CL, and the conductor member 170 supported by the inner peripheral surface 231a of the bush 230 is also allowed to swing in the direction intersecting the center line CL.

As described above, the outer peripheral surface 174a of the intermediate portion 174 of the conductor member 170 is supported by the support portion 245 via the bush 230 and the first elastic body 221. The bush 230 that is in contact with the outer peripheral surface 174a of the conductor member 170 is supported by the first elastic body 221 in a state where the bush 230 has a portion that is not in contact with the inner peripheral surface 245a of the support portion 245, so that the conductor member 170 is supported by the support portion 245 in a state where the conductor member 170 is allowed to swing in the direction intersecting the center line CL. Accordingly, a part of the bending force applied to the conductor member 170 can be absorbed by the first elastic body 221, and thus the conductor member 170 can be made difficult to bend. Further, the bush 230 is supported by the first elastic body 221 in a state in which the bush 230 has a portion that is not in contact with the inner peripheral surface 245a of the support portion 245, so that even when the conductor member 170 and the bush 230 receive a bending force, the bush 230 that is in contact with the conductor member 170 and the support portion 245 that supports the conductor member 170 are unlikely to come into contact with each other. Accordingly, it is possible to provide the shock absorber 20 in which the durability against the bending force is improved.

As shown in FIGS. 2 and 4, the stroke sensor 160 includes the conductor member 170 and the coil unit 250. The coil unit 250 of the stroke sensor 160 is fitted into the first rod 70 and housed in the first rod 70. The coil unit 250 includes a coil 251 and a circular tubular support body 252 that supports the coil 251. The conductor member 170 moves forward and backward in the upper-lower direction along the center line CL inside the support body 252.

As shown in FIG. 4, an insertion length (fitting length) of the conductor member 170 with respect to the coil 251 changes with the extension and contraction motion of the shock absorber 20. At this time, when an alternating current flows through the coil 251, an eddy current is generated in the conductor member 170 so as to cancel a fluctuation of a magnetic field. The eddy current changes the inductance of the coil 251. An amount of displacement of the conductor member 170 with respect to the first rod 70 in a direction of the center line CL, that is, a stroke amount of the shock absorber 20 can be grasped by using the change in the inductance.

The description of the first embodiment is summarized as follows. The shock absorber 20 includes the outer tube 30 having a closed end at the upper end 31 and an open end at the lower end 33, and the inner tube 40 having an open end at the upper end 42 and a closed end at the lower end 41, the inner tube 40 being partially fitted into the outer tube 30 so as to be movable forward and backward. The shock absorber 20 further includes the cylinder 60 extending from the upper end 31 of the outer tube 30 to the inside of the inner tube 40, and the cylindrical first rod 70 extending from the lower end 41 of the inner tube 40 to the inside of the cylinder 60. The first piston 80 fixed to the upper end 72 of the first rod 70 using the first fixing member 90 and the first nut 93 is movable forward and backward in the upper-lower direction inside the cylinder 60. More specifically, the first fixing member 90 is provided at the upper end 72 of the first rod 70, the first piston 80 is fixed to the upper end 72 of the first rod 70 in the axial direction of the first rod 70 by the first fixing member 90 and the first nut 93, and the first piston 80 is movable forward and backward in the upper-lower direction inside the cylinder 60. The shock absorber 20 further includes the second rod 110 extending from the upper end 31 of the outer tube 30 into the cylinder 60, the second fixing member 135 provided at the lower end 111 of the second rod 110, and the second piston 120 fixed to the lower end 111 of the second rod 110 in the axial direction of the second rod 110. The second piston 120 is fixed in the axial direction of the second rod 110 by the second fixing member 135 and the second nut 133, and the second piston 120 is movable forward and backward in the upper-lower direction inside the cylinder 60. In addition, the shock absorber 20 has the first surface 181a of the second nut 133 facing the second piston 120 side and orthogonal to the center line CL of the first rod 70, and has the base end portion 200 having the second groove 202b provided on the second surface 202a facing the first surface 181a and recessed in a direction of the center line CL of the first rod 70. The second elastic body 191 made of an elastic material is fitted into the second groove 202b, and a part of the second elastic body 191 protrudes from the second groove 202b and is in contact with the first surface 181a of the second nut 133. In addition, the shock absorber 20 includes the conductor member 170 which is a rod-shaped conductor having the fixed upper end portion 171 and extending into the first rod 70 through the first piston 80, and the coil 251 provided inside the first rod 70 so as to be capable of detecting displacement of the conductor member 170 with respect to the first rod 70. In addition to these configurations, the first elastic body 221 made of an elastic material is provided adjacent to the conductor member 170 on the outer side of the outer peripheral surface 174a of the conductor member 170, and the support portion 245 that supports the outer peripheral surface of the first elastic body 221 so as to restrict the movement of the first elastic body 221 in the direction intersecting the center line CL of the conductor member 170 is provided. The conductor member 170 extends from the base end portion 200 into the first rod 70 through the first piston 80 and has the annular bush 230 made of resin and having the through hole 231 for supporting the outer peripheral surface 174a of the intermediate portion 174 in the direction of the center line CL of the conductor member 170. The first groove 233 is formed on the outer peripheral surface 232 of the bush 230 over the entire periphery, and the first elastic body 221 made of an elastic material is fitted into the first groove 233. A part of the first elastic body 221 protrudes from the first groove 233 and supports the outer peripheral surface 232 of the bush 230. In the shock absorber 20, the first nut 93 and the support portion 245 are integrally formed.

By supporting the conductor member 170 using the first elastic body 221 and the support portion 245 that supports the outer peripheral surface of the first elastic body 221, a part of the bending force acting on the conductor member 170 can be absorbed by the first elastic body. As a result, the conductor member 170 is less likely to bend, so that the shock absorber 20 including the stroke sensor 160 with improved durability can be provided.

In addition, the shock absorber 20 includes the annular bush 230 made of resin and configured to support the outer peripheral surface 174a between the inner peripheral surface 245a of the support portion 245 and the outer peripheral surface 174a of the conductor member 170, and the first elastic body 221 is provided between the outer peripheral surface 232 of the bush 230 and the inner peripheral surface 245a of the support portion 245.

The bush 230 made of resin is interposed between the first elastic body 221 and the conductor member 170, so that in addition to the above-described effects, the conductor member 170 is easily moved forward and backward in the direction along the center line CL.

In addition, the shock absorber 20 has the first groove 233, which is a groove into which the first elastic body 232 is fitted, in the outer peripheral surface 232 of the bush 230, and a portion of the first elastic body 221 protrudes from the first groove 233 in the direction intersecting the center line CL of the conductor member 170.

A portion of the first elastic body 221 protrudes from the first groove 233, so that the gap Sp is formed between the outer peripheral surface 232 of the bush 230 and the inner peripheral surface 245a of the support portion 245. Accordingly, the bush 230 and the conductor member 170 can be supported in a state where the bush 230 and the conductor member 170 are swingable in the direction intersecting the center line CL. Therefore, in a situation in which a small bending force acts on the conductor member 170, the conductor member 170 swings in the above direction, and thus the bending force can be absorbed. In this way, the shock absorber 20 can absorb the bending force by the gap Sp, so that the forward and backward movement of the conductor member 170 accompanying the extension and contraction movement of the shock absorber 20 can be smoothly performed while protecting the conductor member 170.

On the other hand, when a bending force that cannot be absorbed by the gap Sp acts on the conductor member 170, the conductor member 170 swings until the outer peripheral surface 232 of the bush 230 comes into contact with the inner peripheral surface 245a of the support portion 245, and then the first elastic body 221 and the bush 230 are elastically deformed to absorb a part of the bending force. As a result, it is possible to improve the durability of the conductor member 170 even in a situation in which a large bending force is applied.

In addition, in the shock absorber 20, the first fixing member 90 is provided at the upper end of the first piston 80 and includes the first nut 93 that fixes the first piston 80 to the first rod 70, and the support portion 245 and the first nut 93 are formed of one member.

Since the first nut 93 for fixing the first piston 80 and the support portion 245 for supporting the first elastic body 221 for absorbing a part of the bending force are formed of one member, the above-described effect can be achieved while an increase in the number of components is reduced.

In addition, the shock absorber 20 includes the second rod 110 extending from the upper end 31 of the outer tube 30 to the inside of the cylinder 60, and the second piston 120 fixed to the lower end 111 of the second rod 110 using the second fixing member 135. The second fixing member 135 fixes the second piston 120 in the axial direction of the second rod 110, and the upper end portion 171 of the conductor member 170 is connected to the connecting member 130 which is a part of the second fixing member 135.

As described above, the second rod 110 and the second fixing member 135 for fixing the second piston 120 to the lower end 111 of the second rod 110 are used to connect the upper end portion 171 of the conductor member 170. By integrating the configuration for connecting the upper end portion 171 of the conductor member 170 to the connecting member 130 which is a part of the second fixing member 135, the above-described effect can be achieved while an increase in the number of components is reduced.

Further, the second fixing member 135 has the first surface 181a which is orthogonal to the center line CL of the first rod 70 and faces the second piston 120 side, the upper end portion 171 of the conductor member 170 is adjacent to the base end portion 200 having the second surface 202a facing the first surface 181a, the second surface 202a has the second groove 202b which is a groove recessed in the direction of the center line CL of the first rod 70, the second elastic body 191 made of an elastic material is fitted into the second groove 202b, and a part of the second elastic body 191 protrudes from the second groove 202b.

Since a part of the second elastic body 191 protrudes from the second groove 202b, the base end portion 200 having the second groove 202b can be held in a state of being floated from the first surface 181. Accordingly, the conductor member 170 held via the base end portion 200 can be held in a form capable of swinging in the direction intersecting the center line CL. A part of the bending force can be absorbed by making the conductor member 170 swingable in the direction intersecting with the center line CL, so that the conductor member 170 becomes difficult to bend in such a form, and as a result, the shock absorber 20 including the stroke sensor 160 with improved durability can be provided.

In addition, the second fixing member 135 includes the second nut 133 that is provided below the second piston 120 and fixes the second piston 120 to the second rod 110, and the second fixing member 135 and the second nut 133 are formed of one member.

By adopting such a configuration, the above-described effect can be achieved while an increase in the number of components is reduced.

In the above description, a configuration in which the second elastic body 191 is mounted on the second surface 202a of the flange 202 has been exemplified, and the present invention is not limited thereto, and the second elastic body 191 may be mounted on the first surface 181a.

In the above description, a configuration in which the first elastic body 221 is mounted on the outer peripheral surface 232 of the bush 230 has been exemplified, and the present invention is not limited thereto, and the first elastic body 221 may be mounted on the inner peripheral surface 245a of the support portion 245.

Next, a shock absorber 20A according to a second embodiment will be described with reference to FIG. 10.

Second Embodiment

Figure 10:
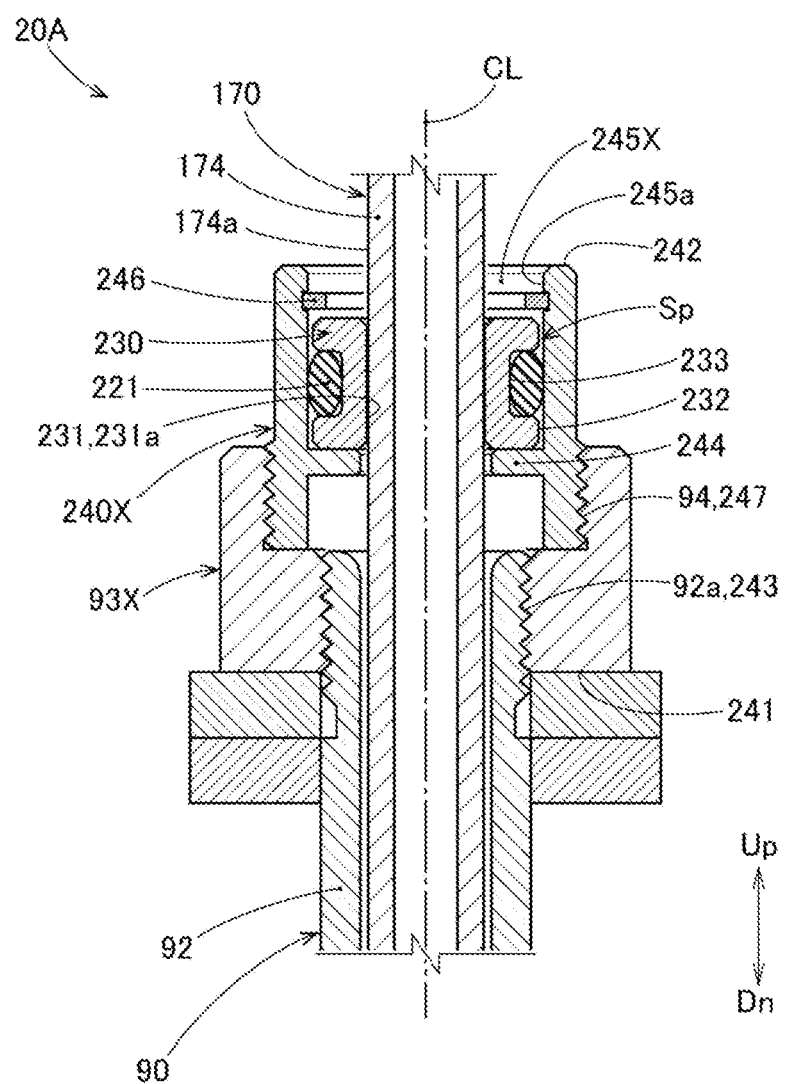
FIG. 10 is a view illustrating a support structure of a first nut of a shock absorber according to a second embodiment and an intermediate portion of the conductor member.

FIG. 10 is a view illustrating a support structure of a first nut 93X of the shock absorber 20A and the intermediate portion 174 of the conductor member 170, and FIG. 10 is a view corresponding to FIG. 8 illustrating the shock absorber 20 according to the first embodiment. The shock absorber 20A shown in FIG. 10 includes the first nut 93X instead of the first nut 93 of the shock absorber 20, and includes a support portion 245X instead of the support portion 245 of the shock absorber 20. Other basic configurations are the same as those of the shock absorber 20. Components common to those of the shock absorber 20 will be denoted by the same reference numerals, and detailed description thereof will be omitted.

The first nut 93X in the shock absorber 20A corresponds to the first nut 93 in the shock absorber 20, and the first nut 93X and the support portion 245X are formed as separate members. The first nut 93X is a tubular member screwed to the male screw 92a of the extending portion 92 of the first fixing member 90, and has the female screw 243 on an inner peripheral surface thereof. The intermediate portion 174 of the conductor member 170 is supported by the support portion 245X via the bush 230 and the first elastic body 221. The first elastic body 221 is provided on the outer side of the outer peripheral surface 174a of the conductor member 170, which is the side away from the center line CL. The support portion 245X supports the outer peripheral surface of the first elastic body 221 so as to restrict the movement of the first elastic body 221 in the direction intersecting the center line CL. The first nut 93X formed of a member separate from the support portion 245X is provided on the lower side of the support portion 245X. A holding member 240X having the support portion 245X is a cylindrical member, and a center line of the holding member 240X is the center line CL. The holding member 240X has a screw portion 247 on an outer peripheral surface on a lower end side, and the screw portion 247 is screwed to a screw portion 94 provided on an inner peripheral surface on an upper end side of the first nut 93X, so that the first nut 93X and the support portion 245X are connected to each other.

In the shock absorber 20A, the first nut 93X and the support portion 245X are formed of separate members, and are connected to each other by screw fastening. In such a configuration, the shock absorber 20A including the stroke sensor with improved durability also can be provided.

Next, a shock absorber 20B according to a third embodiment will be described with reference to FIG. 11.

Third Embodiment

Figure 11:
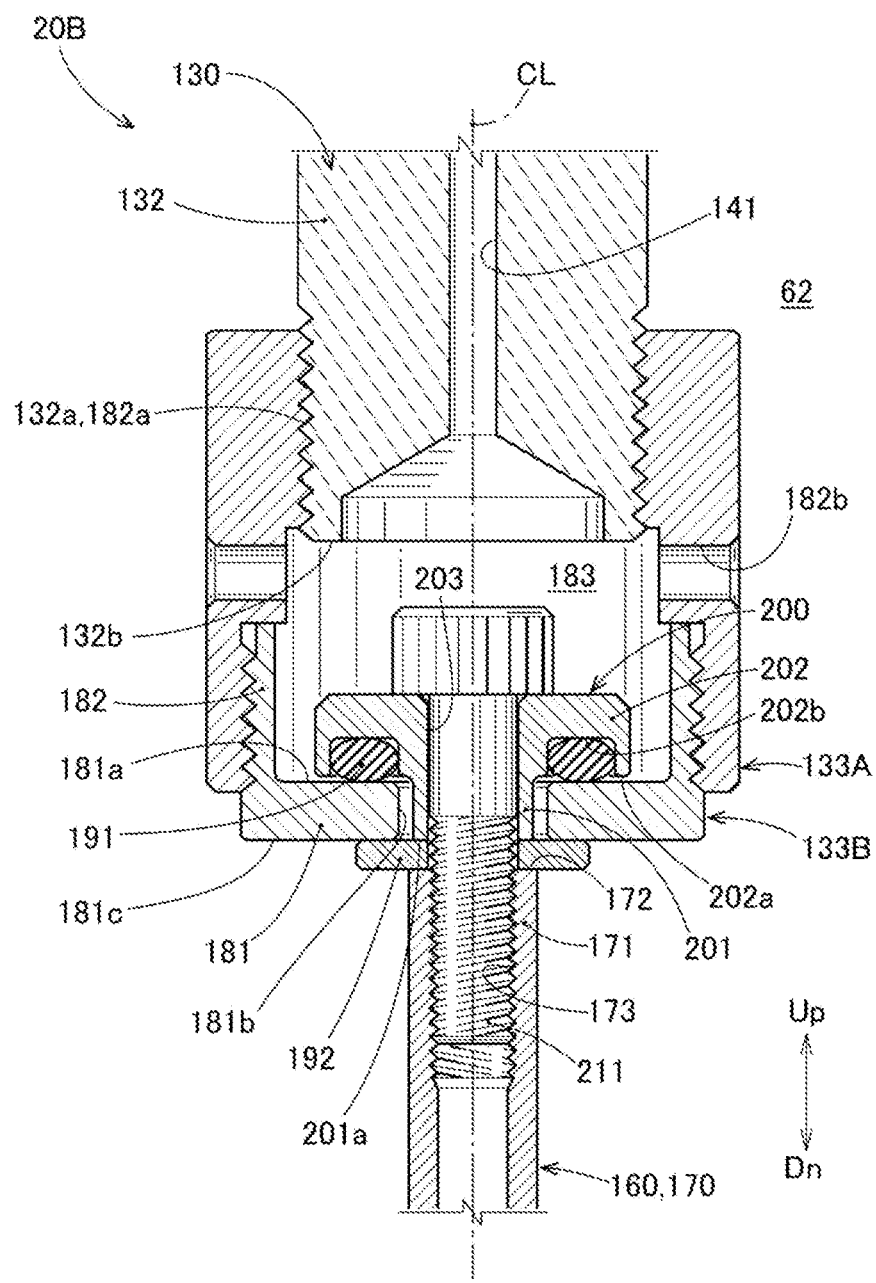
FIG. 11 is a view illustrating a support structure of a second fixing member and a second nut of a shock absorber according to a third embodiment, and an upper end of the conductor member.

FIG. 11 is a view illustrating a support structure of a second nut 133A of the shock absorber 20B and the upper end portion 171 of the conductor member 170, and FIG. 11 is a view corresponding to FIG. 6 illustrating the shock absorber according to the first embodiment. The shock absorber 20B shown in FIG. 11 includes the second nut 133A and a holding member 133B instead of the second nut 133 of the shock absorber 20, and the other basic configuration is the same as that of the shock absorber 20. Components common to those of the shock absorber 20 will be denoted by the same reference numerals, and detailed description thereof will be omitted.

In the shock absorber 20B, the second nut 133A and the holding member 133B are separate members. The second nut 133A is a tubular member screwed to the male screw 132a of the extending portion 132 of the connecting member 130, and has the female screw 182a on an inner peripheral surface on an upper end side. The holding member 133B is a bottomed cylindrical member that connects the base end portion 200 and the second elastic body 191 to the connecting member 130 via the second nut 133A, and includes the bottom plate 181 and the tubular portion 182. The second nut 133A and the holding member 133B can be connected to each other by being screwed to each other.

In the shock absorber 20B, the second nut 133A and the holding member 133B are formed of separate members, and are connected to each other by screw fastening. In such a configuration, the shock absorber 20B including the stroke sensor with improved durability also can be provided.

It should be noted that the shock absorber according to the present invention is not limited to the above-described embodiments as long as the shock absorber achieves the functions and effects of the present invention. For example, any two or all of the shock absorbers 20, 20A, and 20B according to the first to third embodiments can be combined. For example, a shock absorber having the configuration shown in FIG. 10 and the configuration shown in FIG. 11 is also included in the present invention.

Industrial Applicability

The shock absorber according to the present invention is suitable for being mounted as a front fork of a straddle type vehicle.

REFERENCE SIGNS LIST

20, 20A, 20B shock absorber
30 outer tube
31 upper end of outer tube
33 lower end of outer tube
40 inner tube
41 lower end of inner tube
42 upper end of inner tube
60 cylinder
61 upper end of cylinder
64 lower end of cylinder
70 first rod
72 upper end of first rod
80 first piston
90 first fixing member
93, 93X first nut
110 second rod
111 lower end of second rod
120 second piston
130 connecting member
133, 133A second nut
133B holding member
135 second fixing member
160 stroke sensor
170 conductor member
171 upper end portion of conductor member
174 intermediate portion of conductor member
174a outer peripheral surface of intermediate portion of conductor member
181 bottom plate
181a first surface
191 second elastic body
200 base end portion
202a second surface
202b second groove
221 first elastic body
230 bush
231 through hole
232 outer peripheral surface of bush
233 first groove
245, 245X support portion
245a inner peripheral surface of support portion
251 coil of stroke sensor
CL center line

What is claimed is:

1. A shock absorber comprising:
an outer tube having a closed end at an upper end and an open end at a lower end;
an inner tube having an open end at an upper end and a closed end at a lower end, the inner tube being partially fitted into the outer tube so as to be movable forward and backward;
a cylinder extending from the upper end of the outer tube into the inner tube;
a first rod having a circular tube shape and extending from the lower end of the inner tube into the cylinder;
a first piston fixed to an upper end of the first rod by using a first fixing member, the first piston being movable forward and backward in an upper-lower direction inside the cylinder;
a conductor member being a rod-shaped conductor having a fixed upper end portion and extending through the first piston into the first rod;
a coil provided inside the first rod so as to be capable of detecting a displacement of the conductor member with respect to the first rod;
a first elastic body made of an elastic material and provided adjacent to the conductor member on an outer side of an outer peripheral surface of the conductor member; and
a support portion configured to support an outer peripheral surface of the first elastic body so as to restrict movement of the first elastic body in a direction intersecting a center line of the conductor member.

2. The shock absorber according to claim 1,
wherein an annular bush made of resin is provided between an inner peripheral surface of the support portion and the outer peripheral surface of the conductor member so as to support the outer peripheral surface, and
wherein the first elastic body is provided between an outer peripheral surface of the bush and the inner peripheral surface of the support portion.

3. The shock absorber according to claim 2,
wherein one of the support portion and the outer peripheral surface of the bush has a first groove into which the first elastic body is fitted, and
wherein a part of the first elastic body protrudes from the first groove in a direction intersecting the center line of the conductor member.

4. The shock absorber according to claim 1,
wherein the first fixing member includes a first nut that is provided at an upper end of the first piston and fixes the first piston to the first rod, and
wherein the support portion and the first nut constitute one member.

5. The shock absorber according to claim 3, further comprising:
a second rod extending from the upper end of the outer tube into the cylinder; and
a second piston fixed to a lower end of the second rod by using a second fixing member,
wherein the second fixing member fixes the second piston in an axial direction of the second rod, and
wherein the upper end portion of the conductor member is connected to the second fixing member.

6. The shock absorber according to claim 5,
wherein the second fixing member has a first surface orthogonal to a center line of the first rod and facing the second piston side,
wherein the upper end portion of the conductor member is adjacent to a base end portion having a second surface facing the first surface,
wherein one of the first surface and the second surface has a second groove that is recessed in a direction of the center line of the first rod,
wherein a second elastic body made of an elastic material is fitted into the second groove, and
wherein a part of the second elastic body protrudes from the second groove.

7. The shock absorber according to claim 5,
wherein the second fixing member includes a second nut that is provided on a lower side of the second piston and fixes the second piston to the second rod, and
wherein the second fixing member and the second nut are formed of one member.

8. A shock absorber comprising:
an outer tube having a closed end at an upper end and an open end at a lower end;
an inner tube having an open end at an upper end and a closed end at a lower end, the inner tube being partially fitted into the outer tube so as to be movable forward and backward;
a cylinder extending from the upper end of the outer tube into the inner tube;
a first rod having a circular tube shape and extending from the lower end of the inner tube into the cylinder;
a first fixing member provided at an upper end of the first rod;
a first piston fixed to the upper end of the first rod in an axial direction of the first rod by the first fixing member and a first nut, the first piston being movable forward and backward in an upper-lower direction inside the cylinder;
a second rod extending from the upper end of the outer tube into the cylinder;
a second fixing member provided at a lower end of the second rod;
a second piston fixed to the lower end of the second rod in an axial direction of the second rod by the second fixing member and a second nut, the second piston being movable forward and backward in the upper-lower direction inside the cylinder;
a first surface of the second nut that faces the second piston side and is orthogonal to a center line of the first rod;
a base end portion having a second surface facing the first surface and a second groove provided in the second surface and recessed in a direction of the center line of the first rod;
a second elastic body made of an elastic material, the second elastic body being fitted into the second groove, and a part of the second elastic body protruding from the second groove and being in contact with the first surface;
a conductor member which is a rod-shaped conductor extending from the base end portion into the first rod through the first piston;
an annular bush made of resin and having a through hole for supporting an outer peripheral surface of an intermediate portion of the conductor member in a direction of the center line;
a first elastic body made of an elastic material, the first elastic body being fitted into a first groove formed on an outer peripheral surface of the bush over an entire periphery, and supporting the outer peripheral surface of the bush by a part of the first elastic body protruding from the first groove;
a support portion configured integrally with the first nut and configured to support an outer peripheral surface of the first elastic body, and
a coil provided inside the first rod so as to be capable of detecting a displacement of the conductor member with respect to the first rod.

9. The shock absorber according to claim 2,
wherein the first fixing member includes a first nut that is provided at an upper end of the first piston and fixes the first piston to the first rod, and
wherein the support portion and the first nut constitute one member.

10. The shock absorber according to claim 3,
wherein the first fixing member includes a first nut that is provided at an upper end of the first piston and fixes the first piston to the first rod, and
wherein the support portion and the first nut constitute one member.

11. The shock absorber according to claim 6,
wherein the second fixing member includes a second nut that is provided on a lower side of the second piston and fixes the second piston to the second rod, and
wherein the second fixing member and the second nut are formed of one member.

* * * * *